United States Patent
Buscher et al.

(10) Patent No.: US 6,629,411 B2
(45) Date of Patent: Oct. 7, 2003

(54) DUAL DISPLACEMENT MOTOR CONTROL

(75) Inventors: Jeffrey J. Buscher, Lake Orion, MI (US); John R. Gibson, Rochester Hills, MI (US); John S. Hill, Dayton, OH (US); Hong Jiang, Rochester Hills, MI (US); David F. Nickel, Rochester, MI (US); Daniel J. Schutte, Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/851,796

(22) Filed: May 9, 2001

(65) Prior Publication Data

US 2002/0166320 A1 Nov. 14, 2002

(51) Int. Cl.$^7$ ............................................. F16D 31/02
(52) U.S. Cl. ............... 60/425; 137/115.14; 137/115.25; 137/118.07
(58) Field of Search .............. 137/115.14–115.23, 137/115.25, 115.26, 111.07; 60/456, 425

(56) References Cited

U.S. PATENT DOCUMENTS

| | | | |
|---|---|---|---|
| 2,500,627 A | | 3/1950 | Chinn |
| 2,585,348 A | | 2/1952 | Robinson |
| 2,616,259 A | * | 11/1952 | Quintilian .................... 60/425 |
| 3,641,879 A | | 2/1972 | Week et al. |
| 3,664,129 A | | 5/1972 | Schwab |
| 3,768,263 A | * | 10/1973 | Olson et al. .................. 60/425 |
| 3,981,150 A | | 9/1976 | Eftefield |
| 4,005,636 A | | 2/1977 | Dunn |
| 4,043,419 A | | 8/1977 | Larson et al. |
| 4,075,840 A | | 2/1978 | Jesswein |
| 4,130,990 A | | 12/1978 | Amedei et al. |
| 4,144,946 A | | 3/1979 | Melocik |
| 4,174,018 A | | 11/1979 | Liebert et al. |
| 4,179,888 A | | 12/1979 | Goscenski, Jr. |
| 4,189,919 A | | 2/1980 | Goscenski, Jr. |
| 4,206,689 A | | 6/1980 | Peterson |
| 4,223,646 A | | 9/1980 | Kinder |
| 4,275,688 A | | 6/1981 | Abe et al. |
| 4,343,151 A | | 8/1982 | Lorimor |
| 4,410,058 A | | 10/1983 | Dymond |
| 4,414,809 A | | 11/1983 | Burris |
| 4,420,934 A | | 12/1983 | Udono |
| 4,446,697 A | | 5/1984 | Goscenski, Jr. |
| 4,463,557 A | | 8/1984 | Miller et al. |
| 4,470,259 A | | 9/1984 | Miller et al. |

(List continued on next page.)

FOREIGN PATENT DOCUMENTS

| | | |
|---|---|---|
| DE | 3626013 | 7/1986 |
| EP | 0 042 682 | 6/1981 |
| EP | 0 853 030 | 7/1998 |
| GB | 1 522 014 | 8/1978 |
| JP | 62282110 | 12/1987 |
| JP | 63141878 | 6/1988 |
| JP | 03179133 | 8/1991 |
| WO | WO 79/01084 | 4/1979 |
| WO | WO 96/16259 | 5/1996 |

OTHER PUBLICATIONS

"Hydraulic Multiverbrauchersusteme", Techniche Rundschau, No. 13, Mar. 29, 1983.

*Primary Examiner*—Edward K. Look
*Assistant Examiner*—Igor Kershteyn
(74) *Attorney, Agent, or Firm*—Jacox, Meckstroth & Jenkins

(57) ABSTRACT

A hydraulically operated fan for a cooling system in an automotive vehicle. Two hydraulic motors drive a common fan shaft. A control system provides means to bypass flow in parallel with both motors or direct flow to both or one of the motors dependent on inlet flow and cooling signal conditions.

30 Claims, 12 Drawing Sheets

U.S. PATENT DOCUMENTS

| | | | |
|---|---|---|---|
| 4,488,569 A | 12/1984 | Rau | |
| 4,556,078 A | 12/1985 | Wittren | |
| 4,625,751 A | 12/1986 | Gage | |
| 4,664,210 A | 5/1987 | Yamaoka et al. | |
| 4,738,330 A | 4/1988 | Suzuki et al. | |
| 4,798,050 A | 1/1989 | Nakamura et al. | |
| 4,941,437 A | 7/1990 | Suzuki et al. | |
| 4,966,066 A | 10/1990 | Kauss et al. | |
| 5,293,952 A | 3/1994 | Ledamoisel et al. | |
| 5,398,505 A | 3/1995 | Oogushi et al. | |
| 5,471,908 A | 12/1995 | Lech | |
| 5,487,403 A | 1/1996 | Mollo | |
| 5,535,845 A | 7/1996 | Buschur | |
| 5,561,978 A | 10/1996 | Buschur | |
| 5,584,640 A | 12/1996 | Johnson | |
| 5,687,568 A | 11/1997 | Buschur | |
| 5,727,389 A * | 3/1998 | Harries | 60/413 |
| 5,836,347 A * | 11/1998 | Harries | 60/422 |
| 5,881,630 A | 3/1999 | Buschur | |
| 6,021,641 A | 2/2000 | Buschur | |
| 6,158,216 A | 12/2000 | Buschur et al. | |
| 6,209,566 B1 * | 4/2001 | Burdock | 137/115.25 |

* cited by examiner

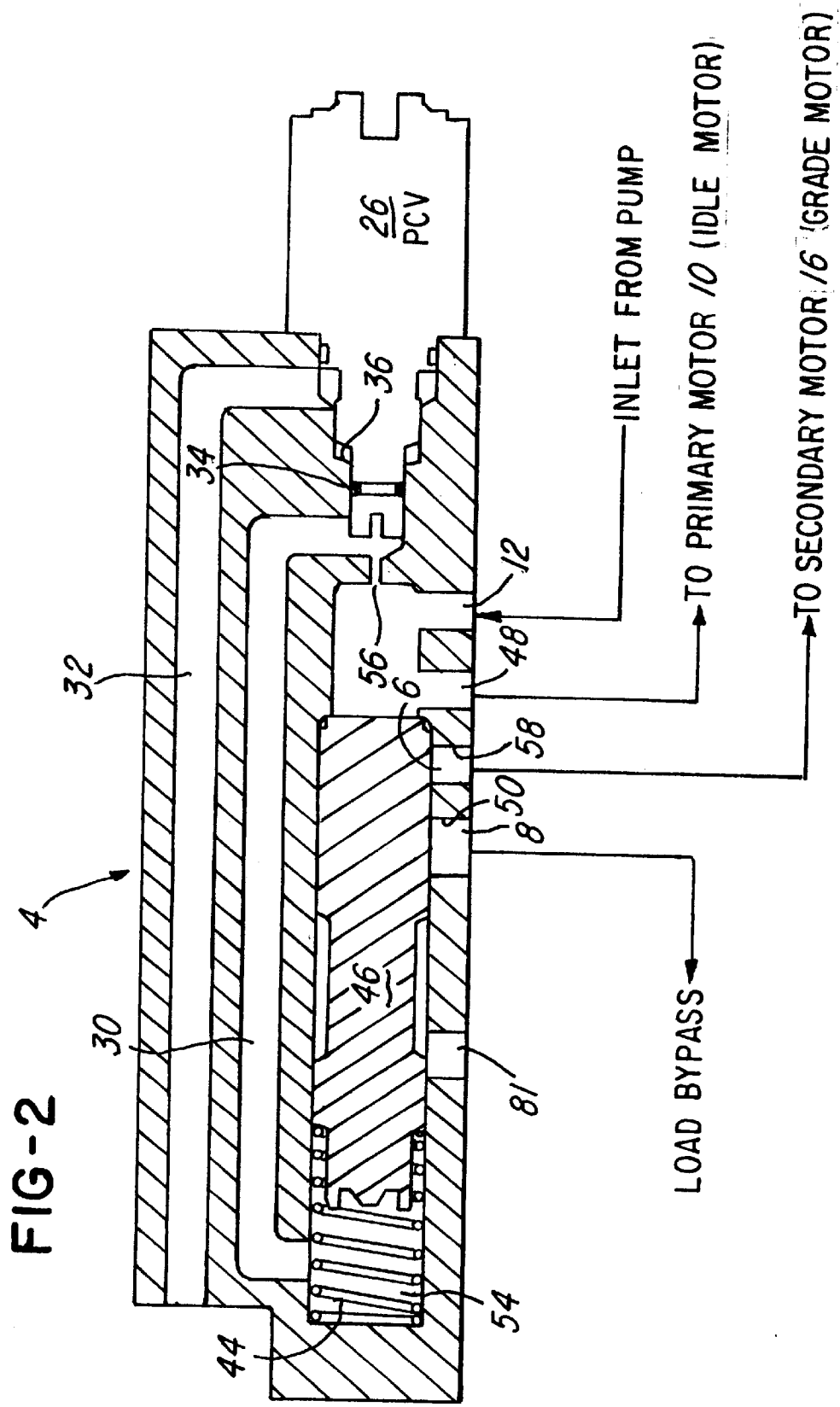

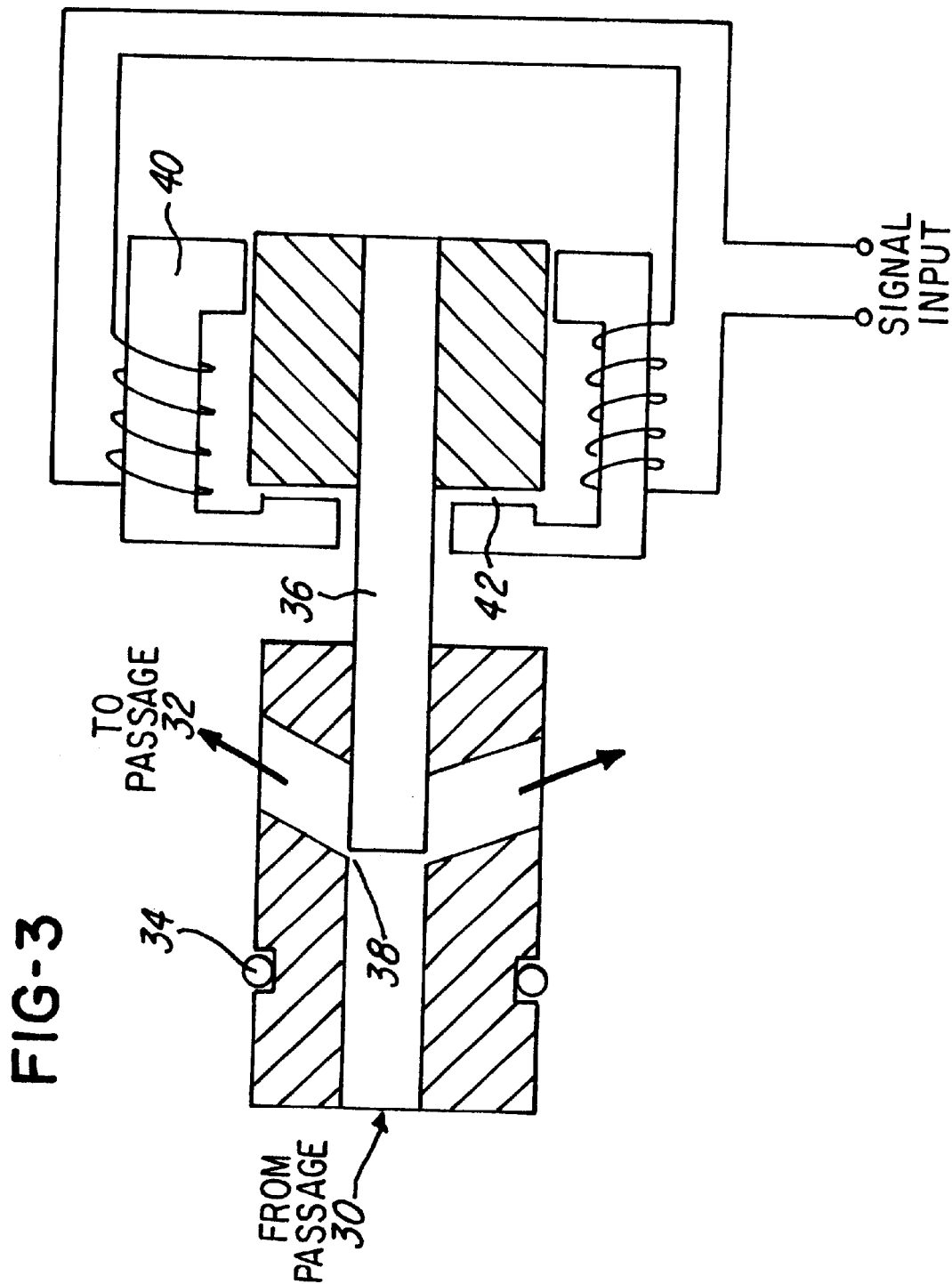

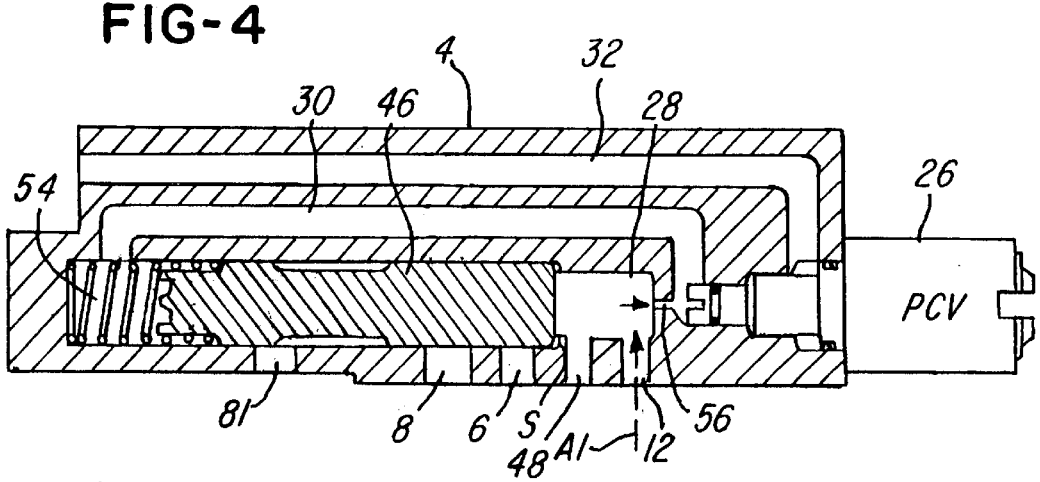
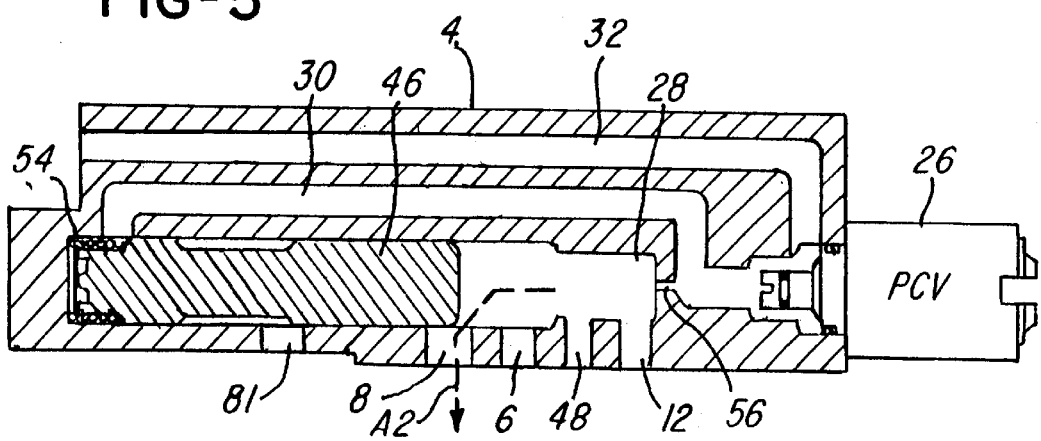
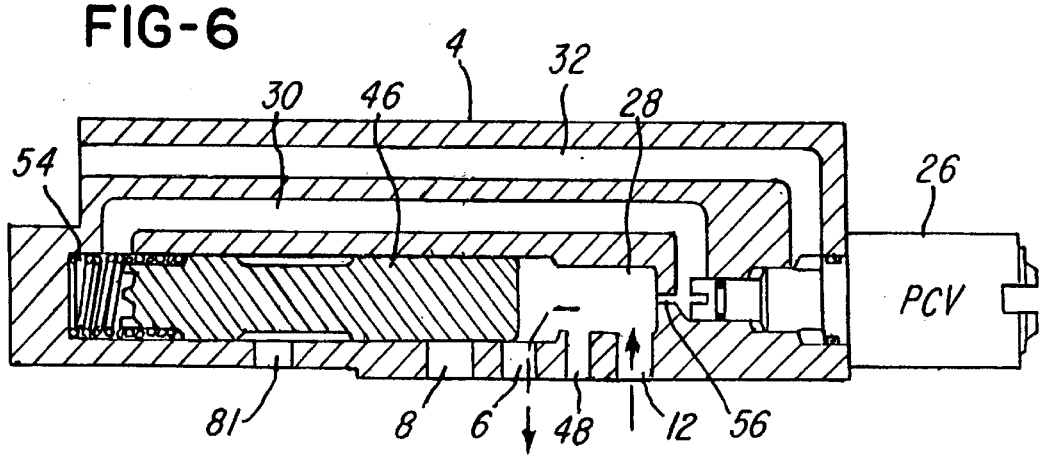

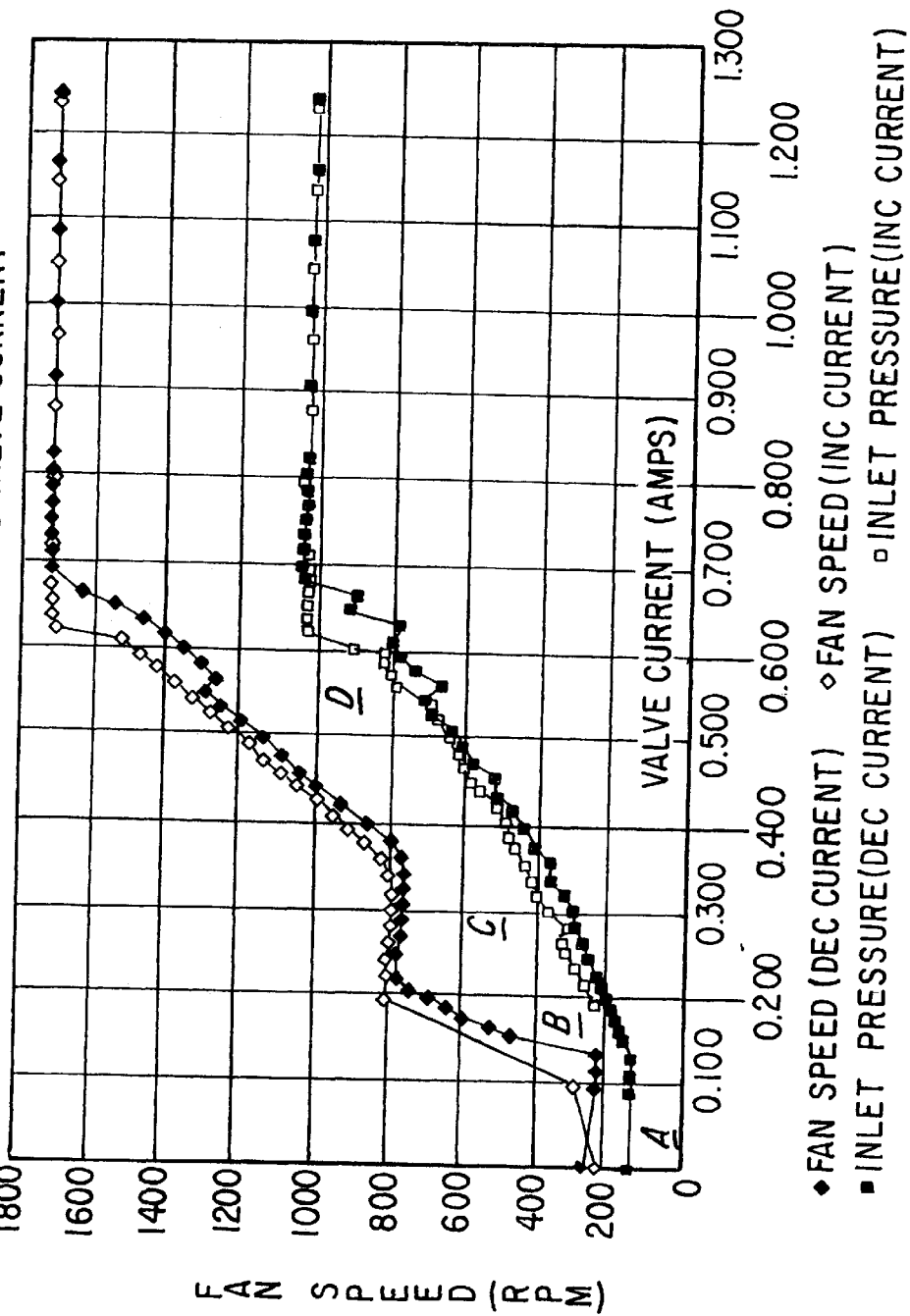

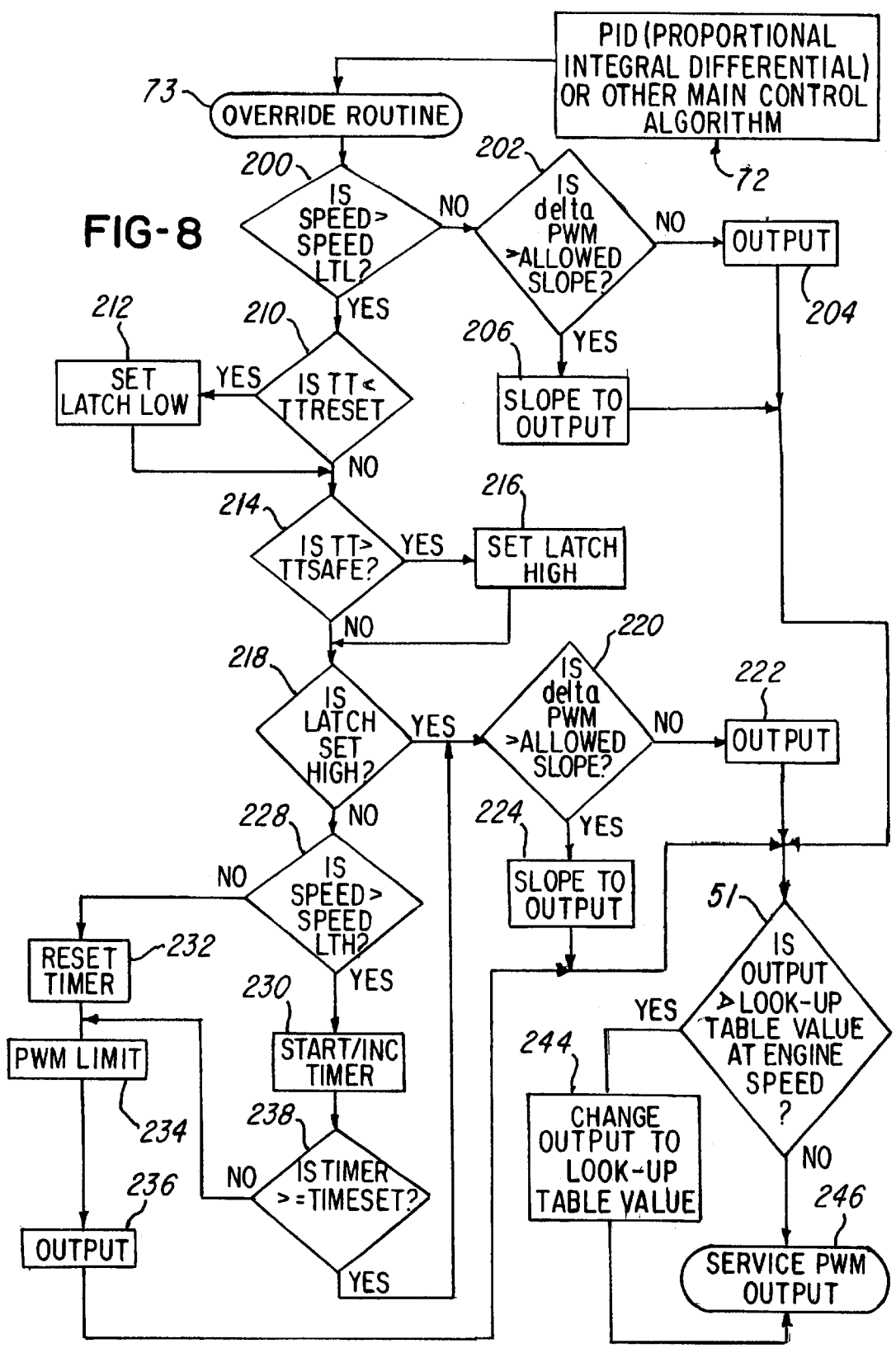

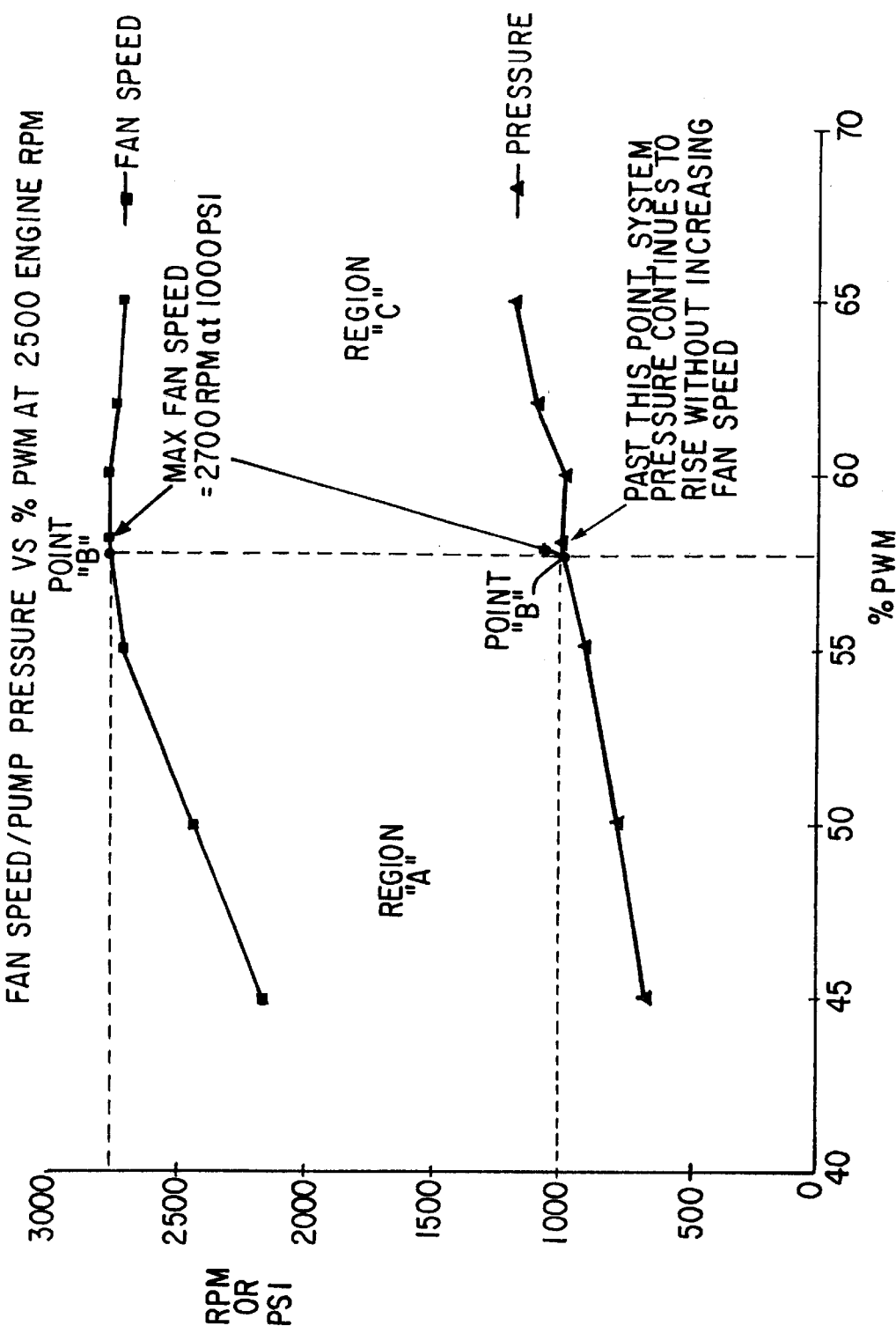

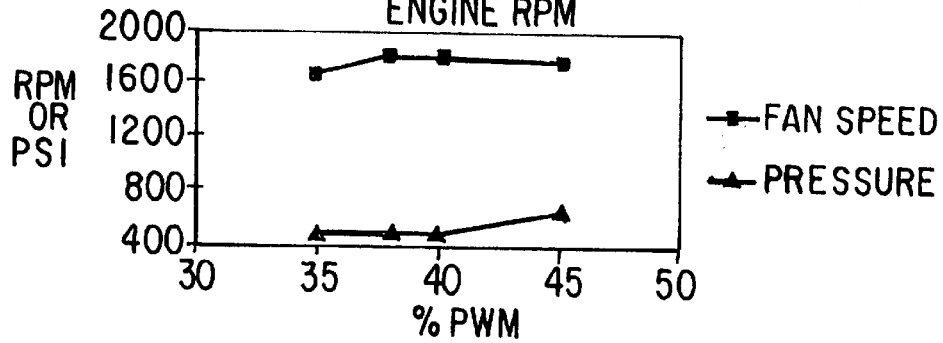
FIG-10A FAN SPEED/PUMP PRESSURE VS % PWM AT 1500 ENGINE RPM
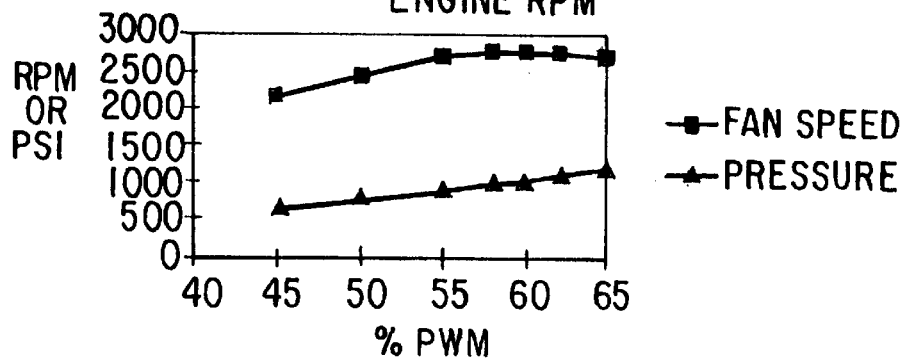
FIG-10B FAN SPEED/PUMP PRESSURE VS % PWM AT 2500 ENGINE RPM
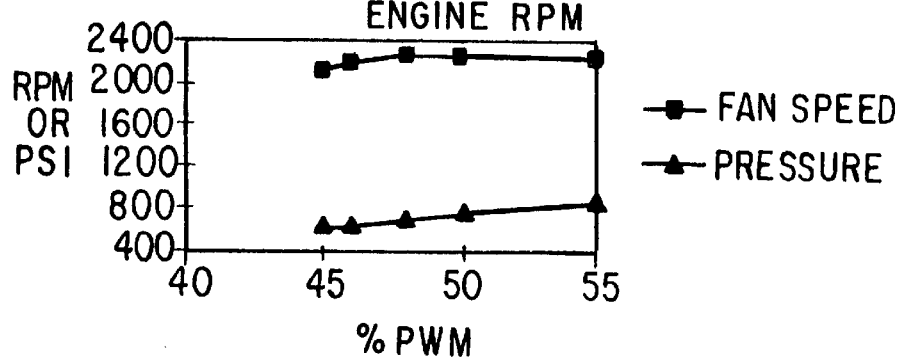
FIG-10C FAN SPEED/PUMP PRESSURE VS % PWM AT 2000 ENGINE RPM

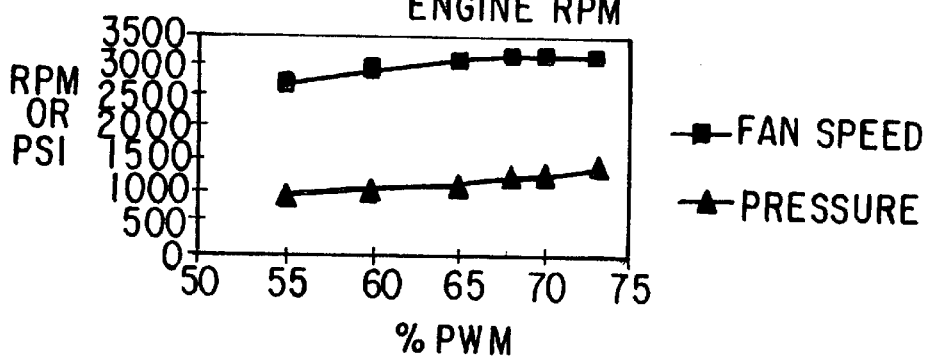
FIG-10D FAN SPEED/PUMP PRESSURE VS %PWM AT 3000 ENGINE RPM
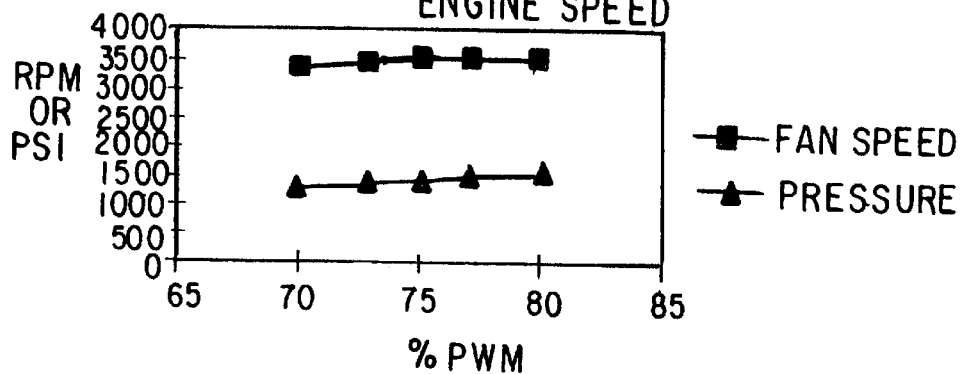
FIG-10E FAN SPEED/PUMP PRESSURE VS % PWM AT 3500 ENGINE SPEED

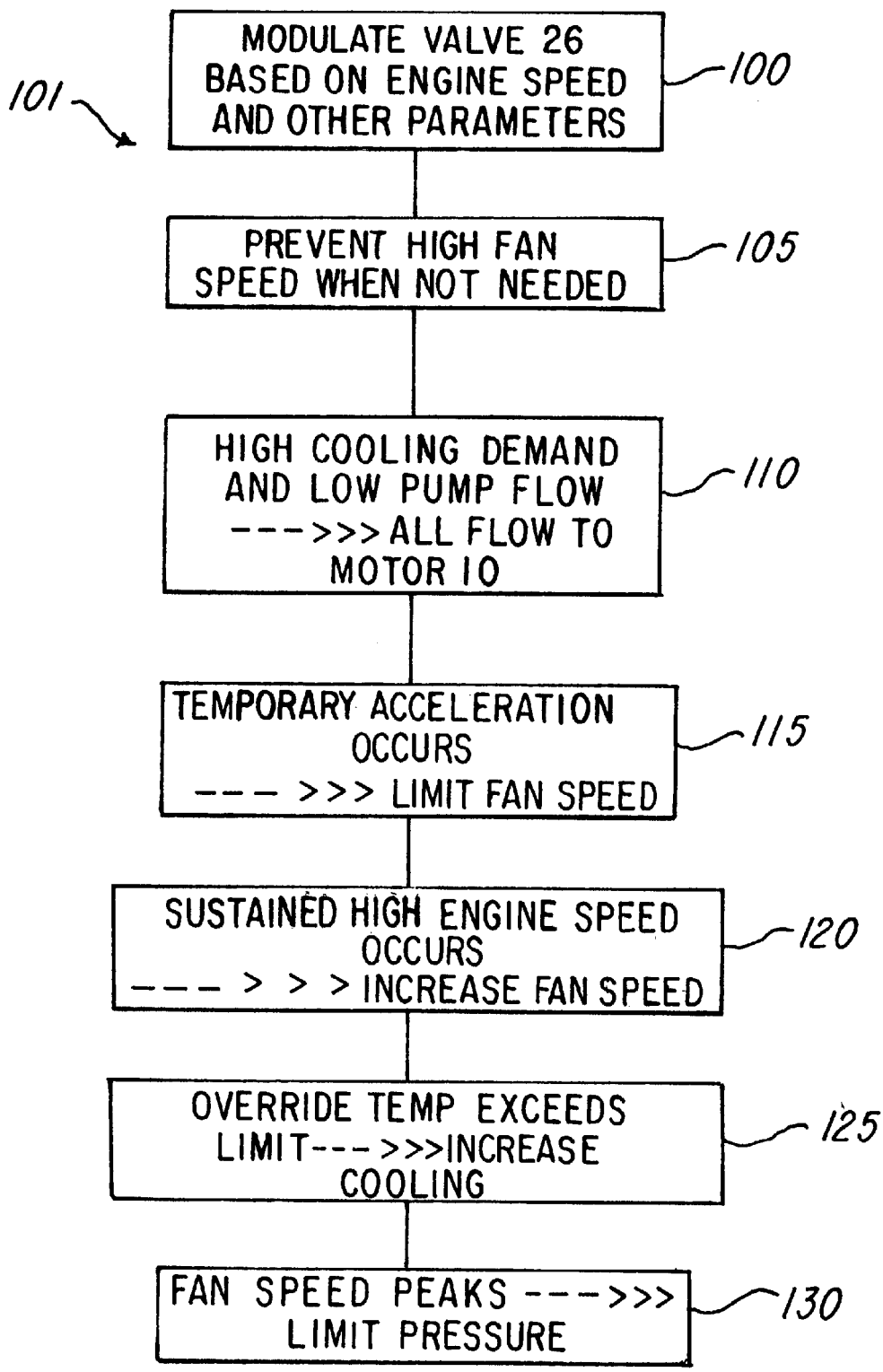

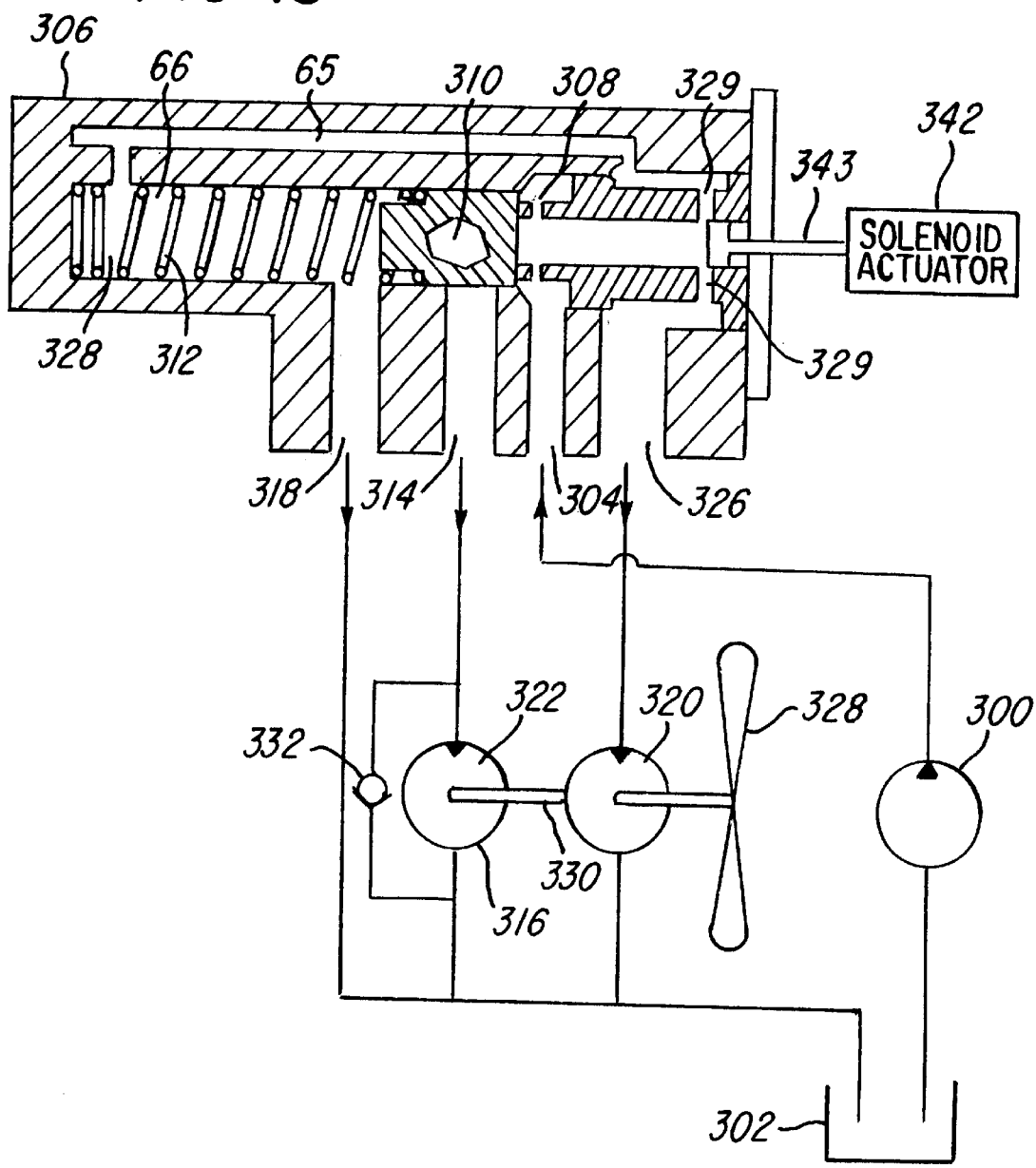

DUAL DISPLACEMENT MOTOR CONTROL

BACKGROUND OF THE INVENTION

In the prior art, hydraulically driven fans have been proposed for cooling of internal combustion engines used in automotive vehicles. However, the proposed systems do not provide an optimal solution. Specifically, many of these systems provide several non-optimal characteristics, including (1) sporadic over-speeding of the fan, producing a situation called "fan roar," and (2) waste of hydraulic energy, especially at low and high engine speeds.

One of the problems inherent to automotive hydraulic systems is compensating for the broad range of engine speeds across which the systems must function. At idle, while engine speed is perhaps 500–700 rpm, there is generally a shortage of flow thus forcing small working chambers and higher system pressure to complete the work. At high engine speeds, such as 3000–5000 rpm, there is an overabundance of flow causing unnecessary hydraulic system power draw and heat generation unless the system pump to working chamber displacement ratios are adjusted.

A means of resolving the issue is through the use of a variable displacement pump, which allows flow production to be adjusted throughout operating ranges.

An alternate solution, as described in U.S. Pat. No. 5,561,978, is to provide a plurality of displacement chambers in the hydraulic load or motor assembly. U.S. Pat. No. 5,561,978 describes means by which flow is introduced to a second motor chamber when the system pressure exceeds some specific predetermined point. The second chamber eventually contributes working force or torque to the load lowering the overall system pressure and allowing the high flow rates produced at high engine speeds to be used effectively.

In this type of system, any time the system pressure is below a predetermined setpoint, all work is done by the first working chamber or motor regardless of engine/pump speed and thus corresponding available flow. This will unnecessarily raise system pressure, power draw and in most cases hydraulic line noise. In a hydraulic load such as a hydraulic cooling fan there would be at least the following two such solutions. Given that the fan speed control allows incremental increases in speed according to cooling needs, the maximum available fan speed would seldom be deployed at idle conditions thus there would be a substantial amount of operating time in which flow to both working chambers would allow the necessary output shaft speeds to be obtained while maintaining system pressures at a substantially lower level. In the second general case, maximum fan speeds at idle would require that all available flow be channeled to a single working chamber to meet the output shaft speed needs. In this case, the engine speeds would increase, as in city traffic, more flow would allow at some point for the second working chamber to be utilized again lowering system pressure and saving power.

U.S. Pat. No. 6,021,641 describes an improvement of the art of U.S. Pat. Nos. 5,561,978 and 5,687,568 which reduces power consumption by employing a separate valve which senses the pressure across the main control valve to meter flow to the second load, in this case a hydraulic motor.

This mechanism is dependent on use of two separate high precision plunger, spring and bore assemblies. This second assembly is an obvious additional cost and also creates additional leakage path for high-pressure oil to the nonproductive grade motor, thereby reducing performance during a critical maximum idle speed operational point at which an idle motor only is producing torque to drive the fan. Further, the second plunger in U.S. Pat. No. 6,021,641 is controlled by the pressure differential across the main control valve after it has completely closed off the primary bypass path. After the primary bypass path is closed, the pressure differential across the primary plunger continues to decline with further pilot actuator stroke, however, this pressure decline is steep and in some cases erratic thus creating discontinuities in fan speed control. Minor changes in tolerance of any number of components can further influence the interaction between the two plungers yielding further negative effects on fan speed resolution.

The object of the present improvement of the art, as defined in the following description and claims, is to, among other things, modify the design to integrate the primary bypass valve and the secondary grade motor metering valve into an arrangement which requires only one moving valve which is much less susceptible to tolerances and/or subject to erratic movement resulting in poor fan speed control.

SUMMARY OF THE INVENTION

In another aspect, this invention comprises method of operating a cooling system in an automotive vehicle, comprising the following steps: operating two hydraulic motors coupled together to drive a cooling fan, selectively operating the motors under one of the following conditions: applying flow at pressure P1 to both motors, applying flow at pressure P2 to both motors, and applying substantially no flow to one motor, flow at pressure P3 to the other motor, wherein P3 is greater than P2, which is greater than P1.

In still another aspect, this invention comprises cooling system for a motor vehicle, comprising a fan, a control means for detecting a high engine speed, and placing a limit on fan speed for a time period.

In yet another aspect, this invention comprises a method of operating a cooling system for a motor vehicle, comprising the following steps running a fan, detecting onset of a high engine speed, and in response to the onset, placing a limit on fan speed for a time period.

In still another aspect, this invention comprises a method of controlling a hydraulically powered fan driven by a hydraulic pump in an automotive vehicle, the improvement comprising the following steps: controlling fan speed based control parameters which include engine speed, placing a limit on fan speed after an onset of a high engine speed, and removing the limit if the high engine speed persists for a predetermined period.

In yet another aspect, this invention comprises a hydraulically powered fan driven by a hydraulic pump in an automotive vehicle, the improvement comprising: means for controlling fan speed based control parameters which include engine speed, means for placing a limit on fan speed after an onset of a high engine speed, and means for removing the limit if the high engine speed persists for a predetermined period.

An object of the invention is to provide an improved hydraulic coolant fan for automotive vehicles.

A further object of the invention is to provide a hydraulic fan for an automotive vehicle, which reduces both wasted hydraulic energy and unnecessary fan roar.

Other objects and advantages of the invention will be apparent from the following description, the accompanying drawings, and the appended claims.

BRIEF DESCRIPTION OF THE DRAWINGS

FIG. 2 is a cross-sectional view of a valve 4 shown in FIG. 1;

FIG. 3 is a cross-sectional view of a PCV valve assembly 14 shown in FIGS. 1 and 2;

FIG. 4 illustrates one operational mode of the invention;

FIG. 5 illustrates another operational mode of the invention;

FIG. 6 illustrates another operational mode of the invention;

FIG. 7 is a generalized plot of speeds and pressures of motors 10 and 16 in FIG. 1, plotted against current of the PCV valve 26;

FIG. 8 is a routine illustrating logic used to control PCV valve assembly 26 in accordance with one embodiment of the invention;

FIG. 9 is a plot of RPM or psi against % PWM;

FIGS. 10A–10E are various plots illustrating various operational characteristics of the invention;

FIG. 12 illustrates generalized logic implemented by one form of the invention; and FIG. 13 is a cross-sectional schematic view of another form of the invention.

DETAILED DESCRIPTION OF THE INVENTION

Overall System

Figure 1:
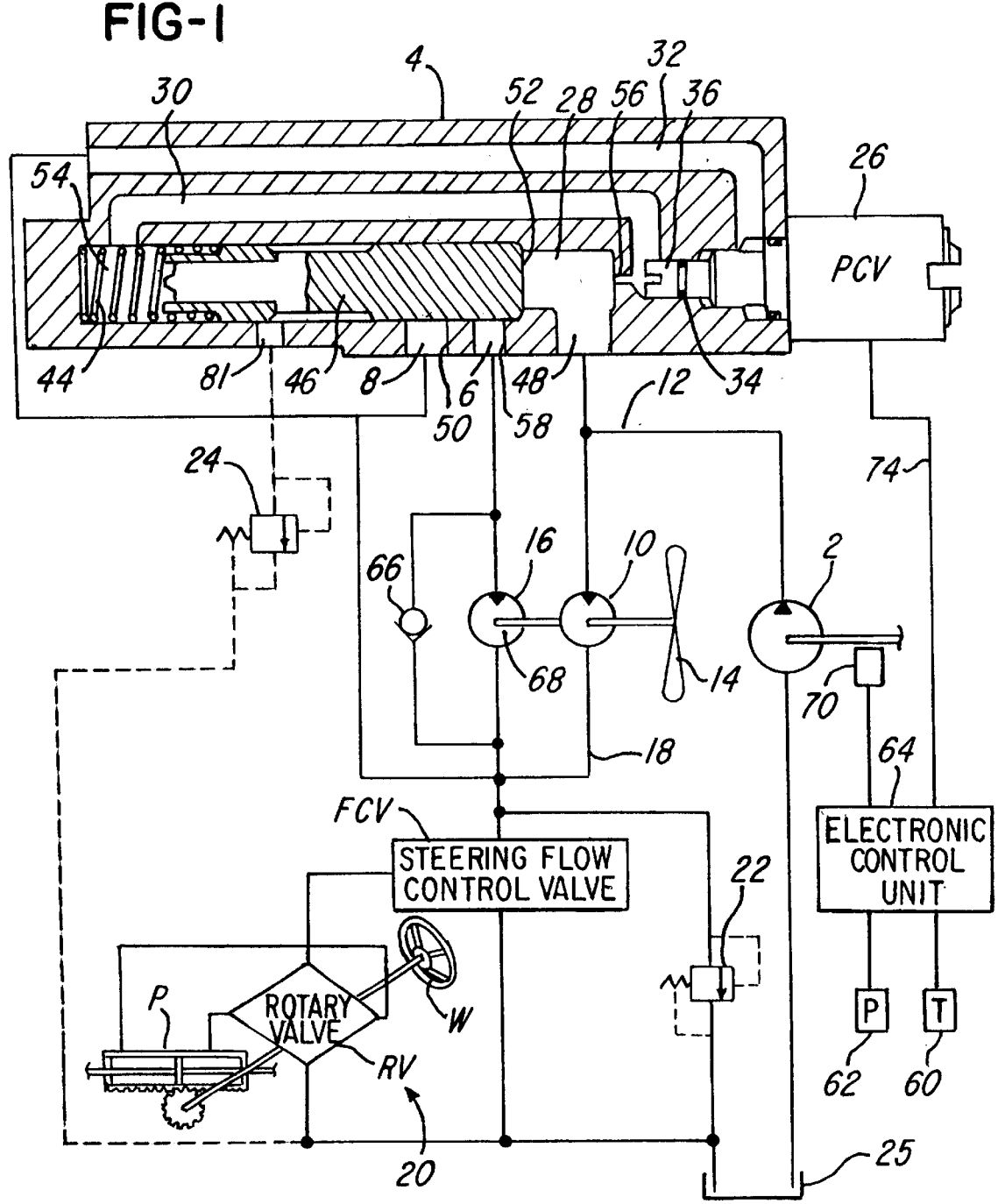
FIG. 1 is a cross-sectional view of one form of the invention.

FIG. 1 illustrates one form of the invention. Hydraulic fluid is pressurized by a pump 2, which is driven by an engine (not shown) in a vehicle (also not shown). That pressurized fluid is delivered to a hydraulic valve 4 described later, which controls flow of that fluid to output ports 6 and 8.

That pressurized fluid is also delivered directly to a hydraulic motor 10, which is a primary idle motor. Thus, whenever the pressure in line 12 exceeds any minimal threshold required by motor 10, motor 10 rotates cooling fan 14. Fan 14 cools the radiator (not shown), thereby cooling coolant (not shown) of the engine (not shown).

Valve 4 controls the pressure of fluid in line 12, primarily by controlling the amount of fluid, which is diverted to outlet ports 6 and 8. For example, when fluid is diverted to port 6, pressure delivered to motor 10 is reduced, thereby reducing its speed, and a second motor 16 begins to run because of the diversion. Motor 16 is a secondary grade motor. Details of this control strategy will be described later.

The fluid outputs of motors 10 and 16 are fed to manifold 18, which supplies a power steering system 20, known in the art. A flow control valve FCV delivers a controlled flow to a rotary valve RV, which is controlled by a steering wheel W. The rotary valve RV and the steering wheel W cooperate to control piston P that controls the angular position of the front wheels of the vehicle. Pressure relief valves 22 and 24 are provided to protect against over pressurization.

A sump 25 collects spent hydraulic fluid and supplies it to pump 2.

The operation of valve 4 will now be described in more detail.

FIGS. 1 and 2 illustrate valve 4. A Pressure Control Valve, PCV valve 26 controls pressure within cavity 28. The PCV valve 26 controls this pressure by controlling the resistance to flow from passage 30 to passage 32. FIG. 3 provides a schematic representation of the operation of PCV valve 26.

In FIG. 3, passages 30 and 32 are indicated. For reference, an O-ring 34 isolating the two chambers is shown in the figures. The left-right position of armature 36 in FIG. 3 determines the amount of communication between passages 30 and 32 when restrictor or plunger 46 is in the position shown in FIG. 1. The restrictor or plunger 46 also controls the pressure applied to motors 10 and 16. When armature 36 fully mates with valve seat 38, communication between passages 30 and 32 is blocked. As the armature 36 moves to the right, the amount of communication increases. The amount of current flowing through electromagnet 40 determines the left-right position of armature 36.

It should be appreciated that the flow between passages 30 and 32 is determined by the size of orifice 56 and the pressure on the ends of plunger 46 at the metering position on ports 6 and 8. Thus, the armature 36 in FIG. 3 defines a pressure gradient on the flow moving from passage 30 to 32.

Thus, it should be appreciated that a pressure gradient proportional to electrical signal input to PCV 26 is provided from passage 30 to passage 32 through valve gap 38. As valve assembly 26 drains away flow from the passage 30 to passage 32 downstream of the load, the spring chamber 54 is also drained. This allows the restrictor or plunger 46 to fall back to the left (as viewed in FIG. 1) allowing bypass at passage 8. Flow through orifice 56 replenishes the pressure in passage spring chamber 54, however, the restriction (typically on the order of 0.040" diameter in the embodiment being described) prevents the valve 26 from saturating. The pressure across orifice 56 will be equal to the delta defined by spring compression at plunger edge 52 when at 50. This pressure drop across orifice 56 will define the flow depleted by any leakage from spring chamber 54 to bypass 50 around the lands of restrictor or plunger 46, passing through the valve gap 38 during periods of modulation. In the embodiment being described, the flow would thus be on the order of 0.16 GPM.

When full current passes, armature 36 is drawn to the left (as viewed in FIGS. 1–3), the air gap 42 becomes eliminated and full seating occurs, thereby blocking all flow. When zero current passes, the armature 36 is positioned fully to the right (as viewed in FIGS. 1–3), and maximum communication between passages 30 and 32 occurs. At intermediate levels of current, the armature 36 is positioned at an intermediate position, and the amount of pressure drop across 38 is determined by the amount of current flowing through electromagnet 40.

In FIGS. 1 and 2, passage 32 is permanently connected with outlet port 8. Passage 32 does not communicate with passage 30. Rather, the amount of communication between those passages is determined by the position of armature 36 in FIG. 3 as explained above. Again, armature 36 in FIG. 3 corresponds to PCV valve 26 in FIG. 2.

During operation, a biasing spring 44 (FIGS. 1 and 2) pushes restrictor or plunger 46 to the right closing off passages 6 and 8. Flow is forwarded to the primary motor 10 through port 48 (FIG. 2 or directly by line 12 in FIG. 1). Given a motor driven fan 14 as the load, pressure will build in cavity 28 as the square function of flow. As pressure builds in cavity 28, restrictor or plunger 46 will be forced to the left (as viewed in FIG. 2) compressing spring 44. Ignoring passage 6 and secondary load for now, the restrictor or plunger 46 will continue to move to the left until flow is bypassed at metering edge 50 of passage 8. At this point, the pressure in cavity 28 and applied to the primary motor 10 will be equal to the spring 44 compressive load when plunger face 52 reaches edge 50 divided by the diametral area of restrictor or plunger 46. This pressure differential from right side to left side of restrictor or plunger 46 at this point would typically be about 25 psi. This would maintain ongoing equilibrium if it were not for feedback passage 30 which allows pressure to transverse from cavity 28 to spring chamber 54 (via passages 30 and 56). This allows the pressures on each end of the restrictor or plunger 46 to equalize. At this point, the restrictor or plunger now being influenced solely by the force of the spring 44 will force the restrictor or plunger 46 again to the right closing off passage 8.

As can be seen, all fluid from line 12 becomes directed to load through port 48. However, tapping off feedback passage 30 there is an additional pathway to output 8 through PCV valve 26 and valve drain passage 32. Given O-ring 34 all flow passing from 30 to 32 must pass through the valve seat 38 (FIG. 3).

Referring again to FIG. 2, a pressure gradient proportional to electrical signal input to PCV 26 is provided from passage 30 to 32 through valve assembly 26. PCV valve 26 drains away flow from the passage 30 to passage 32, downstream of the load, the spring chamber 54 is also drained thus allowing the restrictor or plunger to fall back to the left allowing bypass at port 8. Flow through orifice 56 replenishes the pressure in passage 30; however, the restriction typically is on the order of 0.040" diameter prevents the PCV valve 26 from saturating.

Pressure across orifice 56 will be equal to the 25 psi delta defined by spring compression at plunger face 52 when at metering edge 50 as defined before. This Dp across orifice 56 will define the flow, depleted by any leakage from spring chamber 54 to bypass annulus 81 around the lands of restrictor or plunger 46, passing through the PCV valve 26 during periods of modulation. This flow would thus be on the order of about 0.16 GPM. The pressure across orifice 56 will also be equal to the differential found from cavity 28 to spring chamber 54. Thus, the pressure applied to the load will be 25 psi higher than the control pressure defined by the electrical signal applied to PCV valve 26. If pressure in cavity 28 increases, for example, due to additional flow input at line 12, pressure across orifice 56 will climb leading to a pressure imbalance on the restrictor or plunger which will shift slightly to the left allowing motor output to orifice 8. One suitable pilot operated pressure control system is described in U.S. Pat. No. 4,189,919, which is incorporated herein by reference and made apart hereof.

If flow through line 12 falls, the pressure differential across orifice 56 would drop. The opposite pressure imbalance then exists, and the restrictor or plunger would drift to the right (as viewed in FIG. 2), thereby restricting passage to output 8. It should also be seen that if the electrical signal to the PCV valve 26 is defining a control pressure which exceeds that which can be generated by the present available flow entirely directed to the load, flow through the PCV valve 26 will cease with the differential across orifice 56 and thus the restrictor or plunger 46 coming to zero. This will allow the spring 54 to again be the sole force acting upon the restrictor or plunger 46 and it will move to the right (as viewed in FIG. 2).

The second bypass or output port 6 controls flow to the secondary motor 16, as mentioned earlier. During normal modulation, with pressure applied to both loads, excess fluid flows through output 8 with a 25 psi Dp across the restrictor or plunger 46 and approximately 0.16 GPM pilot flow through both the PCV valve 26 and the spring chamber 54 leakage.

If a pressure signal which exceeds the pressure which can be produced by distributing the available flow to both loads (motors 10 and 16) is commanded by the PCV valve 26, then the restrictor or plunger 46 would move to the right completely covering output 8 and continuing forward until a restriction is created by plunger face 52 and right edge 58 of output port 6. At this point, the restriction in the feed to the secondary motor 16 would raise the system pressure until the command pressure signaled by the PCV valve 26 can be obtained. The PCV valve 26 would then function modulating the bypass at output port 6 in direct proportion to a PCV command, however, the Dp across the plunger and orifice 56 would be reduced as defined by the spring compression at the intersection of right edges 58 and plunger face 52 which may now be on the order of 15 psi with pilot flow through the PCV valve 26 of 0.125 gPM.

Referring to the embodiment shown in FIGS. 2 and 4–6, the system operation will be further described. Displacement pump 2 might be driven at idle conditions such that 2.25 gPM are forwarded to hydraulic valve assembly 4. As previously mentioned, motor 10 would always be exposed to the flow supply however, dependant on the status of output 8 of the majority of flow may bypass the hydraulic motor 10. Upon initial conditions radiator temperature sensor 60 and air conditioning system head pressure sensor 62, for example, would likely both be below pre-established setpoints or thresholds upon which controller unit 64 would forward a fan command to PCV valve 26. The pressure command signal to PCV valve 26 would be zero and the total system pressure, including the integrated steering system 20 would be at a minimum. In the embodiment being described, there would be approximately 45 psi applied to the fan motors 10 and 16, 25 psi to depress restrictor or plunger 46 to output 8 and approximately 20 psi pressure signal applied by the PCV valve 26 despite its off condition due to drainage of the 0.16 gPM pilot through the relaxed valve. In this mode, fan speed may be 150–200 rpm, as represented by area A in FIG. 7.

As the vehicle cooling demands increase, sensors 60 and 62 would trigger a higher command requirement through control unit 64. As previously described, subsequent pressure signal increases at PCV valve 26 causes the restrictor or plunger 46 to move to the left or right (as viewed in FIG. 3), forcing more flow through motors 10 and 16 until the pressure command was balanced by the load pressure as depicted by area B in FIG. 7.

When the pressure command exceeds the pressure that the total 2.25 gPM available flow through the two motors while driving the given fan load in combination can produce, the restrictor or plunger 46 will rapidly move from total coverage of bypass port 8 to a metering condition on output port 6. Now further increases in pressure command will raise system pressure while fan speed remains relatively constant, as per area C in FIG. 7.

Substantially simultaneously, the pressure drop across output port 6 rises faster than the overall system pressure rises until the pressure is equal to the total drop across hydraulic motor 10. Note that restrictor or plunger 46 (FIG. 1) operates to restrict output flow through passage 6, thereby creating a restriction in series with motor 16. Accordingly and during this period, the torque previously produced by motor 16 is shifted to motor 10. Now with yet further increases in signal pressure at PCV valve 26, the fan speed again resumes its climb to the final maximum available flow with the full 2.25 available flow directed to hydraulic motor 10. It should be noted that as fan speed resumes its climb in zone D (FIG. 7), check valve 66 or slipclutch 68 must be employed to allow the fluid to re-circulate or the shaft to be over driven, respectively. It should also be noted that while the fan speed exhibited a distinct plateau in its ascent, as illustrated in FIG. 7, the rise in fan pressure was relatively constant with input command in this case depicted as valve current. Further increases in signal pressure would have little or no impact on fan speed or system pressure.

Given that a single pressure command can result in two separate fan speeds, two problems can be introduced when additional flow is introduced by increased pump speed at port 48. The fan speed could now rapidly accelerate, resulting in fan roar, as the pressure command previously prescribed for application to one motor is now applied to both motors. Alternatively, the system could become very inefficient metering on port 6 and employing one productive motor as opposed to metering on port 8 and using the combination of two motors resulting in lower system pressures.

In order to resolve this and other operational issues, an engine speed sensor 70 (FIG. 1) may be provided as an input to controller 64. In FIG. 1, the electronic control unit 64 monitors vehicle parameters to control the fan speed. Typical parameters that are monitored may include: air conditioning compressor head pressure 62 and engine coolant fluid temperature entering the radiator (top tank temperature) 60. Other parameters could also be monitored, such as under hood temperatures, engine oil temperature and transmission oil temperature.

Different methods can be utilized to derive an output signal to the control valve PCV valve 26 (FIG. 1) which will vary the fan speed to control multiple vehicle parameters. The information contained below, which utilizes engine speed as an input function to the electronic control unit 64 (FIG. 8) can be applied to a control algorithm or routine to control the signal to PCV valve 26.

Referring now to FIG. 8, in the embodiment being described, the fan control logic utilizes a proportional and integral algorithm or other main control algorithm or routine 72 controls the fan speed. The routine monitors the difference between the set point of each parameter being controlled and the actual value of the parameter and controls the fan speed based on the parameter that has the largest positive difference between the actual value and the set point. The control unit 64 then sends an energy PWM output signal 74 to the pressure control valve assembly 26 (FIG. 1), which in turn controls or regulates the fan speed as described herein.

The engine speed may also be used as an input to the electronic control unit 64. By using the engine speed as an input to the electronic control unit 64, limits can be set in the control routine 72 or an override routine 73 based on engine speed which will limit the fan speed at times when increased flow into line 12 would normally result in increased fan speed.

During high cooling requirement and low pump flow conditions, all available flow is directed to hydraulic motor 10. Upon acceleration from idle, for example, a PWM limit (block 234) is imposed when the engine speed is greater than a set limit (Speed LTL) at decision block 200, which limits the service PWM output, which is the output signal control PCV valve 26. Referring to FIG. 1, this will limit the PWM output signal 74 (i.e., the current in the embodiment described) to the pressure control valve assembly 26 which will cause the restrictor or plunger 46 to fall back (i.e., move to the left in FIG. 1) allowing flow to go to the output port 8 instead of to both motor chambers. This will prevent the cooling fan 14 from roaring due to the increased flow from the pump 2 coming into line 12.

Referring again to FIG. 8, a release mechanism may be programmed into the controller 64 to disengage the imposed PWM limit at block 234 to allow maximum cooling capacity of the hydraulically driven fan 14 (FIG. 1). The limit is no longer applied when an engine speed exceeds a release limit speed (Speed LTH at block 228) for some period of time (timeset) as determined at block 238. When the engine speed exceeds the speed LTH at block 228, a timer is started (startline at block 230). When the timer is greater than or equal to the timeset threshold, as determined at block 238, the routine will forward an output greater than limit 234 only if an allowed slope (such as 5% PWM per second)is less than a PWM limit. If the allowed slope is greater than the PWM limit (at decision block 220), the routine will apply a slope (block 224), to an output value 204, to prevent fan roar. The output from either block 234 or 224 is compared (block 51) to a value (not shown) from a look-up table (not shown) of engine speed. If the output is not greater then the routine proceeds to block 246 where the PWM output is serviced. If the output is greater, then the routine (block 244) changes the output to the value from the look-up table.

It should be understood that the purpose of the timer (block 230) is to prevent fan roar from occurring during heavy accelerations when the engine speed may exceed the speed LTH (block 228) for a short period of time while the transmission is shifting gears.

The PWM slope at block 202 is also imposed if a PWM limit is disengaged due to the engine speed dropping below the speed LTL limit (block 200) when an output from block 72 is greater than a PWM limit (block 200 in FIG. 8). Again, this will prevent the fan from roaring.

While the PWM limit 234 is imposed, a fail-safe mode on the engine coolant temperature entering the radiator (top tank temperature) is added to ensure maximum cooling capability. This is done to ensure the vehicle will not overheat if for some reason the vehicle is in and out of engine speed LTH limit (block 228) which will constantly start the counter over every time the engine speed drops below a speed LTH (block 228). To apply this failsafe mode, there is a latch mechanism that is set (latch high) at block 216 when the top tank temperature is greater than a top safe (tsafe) temperature at decision block 214. This latch will not "unlatch" until the top tank temperature drops below another limit, (ttreset), which is determined at block 210. As before, a slope is applied to ramp the PWM (block 220) to the output (block 222) to avoid rapid changes in the speed of fan 14 (FIG.1).

To address the inefficient condition when the pressure increases with no increase in fan speed (from FIG. 1, when the restrictor or plunger 46 is metering on port 6 instead of port 8), the engine speed is used to place a maximum limit on the output to PCV valve 26. By placing a limit on the output, the PCV valve 26 is limited to a minimum amount of flow through to passage 32 (FIG. 1) and, therefore, it will prevent the restrictor or plunger 46 from moving forward far enough to keep it from metering on port 6. This inefficiency can be seen from FIG. 9. This particular case was run at 2500-RPM engine speed. As can be seen from FIG. 9, the fan speed and pressure increase with increasing fan command (% PWM) in Region A. The fan speed hits a maximum at Point B (2700 RPM and 1000 psi). In Region C in FIG. 9, the system pressure continues to increase with increasing fan command (% RPM), but there is no increase in fan speed. The result of this condition is additional load on the engine with no additional work being performed. To remedy this situation, another limit is placed on the output generated to prevent the fan command from increasing into Region C. Since the pressure drop created across the restrictor or plunger 46 is dependent upon the flow into line 12, a different maximum limit is required for multiple flows/ engine speeds. This can be seen in FIG. 9, where the maximum fan speed occurs at high % PWM with increasing flow (i.e., engine speed).

Figure 11:
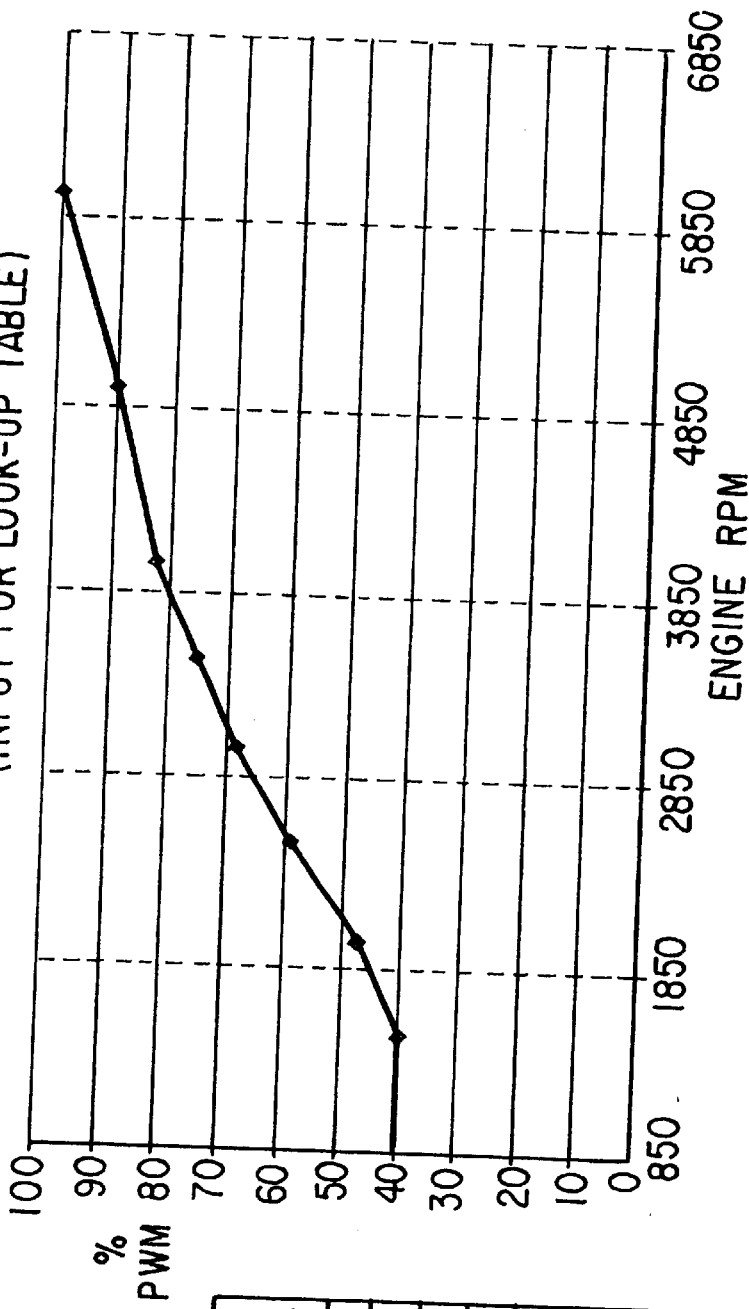
FIG. 11 is a plot of maximum PWM as a function of engine speed which may be used as input for a look-up table.

FIG. 11 summarizes the information contained in FIG. 9. The curve shows the maximum output PWM as a function of engine speed. This curve is incorporated into the control algorithm as a "look up table" at block 51 (FIG. 8). This will limit the maximum output 74 based on engine speed to prevent the system pressure from increasing past the point where no additional fan speed is achieved.

A generalized description of the embodiment being described will now be described in terms of three operational regimes. FIG. 4 shows the first regime. Full current is applied to the electromagnet 40 in FIG. 3. Consequently, PCV valve 26 in FIG. 4 is fully closed, so communication between passages 30 and 32 is blocked. Pump 2 in FIGS. 1 and 2 applies pressure to cavity 28 in FIG. 4, as indicated by dashed arrow Al. This pressure will initially drive restrictor or plunger 46 to the left (as viewed in FIG. 4). However, because orifice 56 allows fluid to bleed into passage 30, the pressure in that passage quickly equalizes with that in cavity 28. Thus, spring 54 controls the position of restrictor or plunger 46 and drives restrictor or plunger 46 into contact with shoulder S. In this first regime, hydraulic motor 10 in FIG. 1 runs, but motor 16 does not contribute torque.

FIG. 5 shows a second regime. The PCV valve 26 is open to a significant degree, which can be caused by zero current being delivered to electromagnet 40 in FIG. 3. In FIG. 5, passage 30 communicates with passage 32, which, as shown in FIG. 5, communicates with output port 8. Because of the small size of bleed hole 56, about 0.040 inch diameter in the embodiment being described, the pressure in passage 30 does not equalize (remains less than within that in cavity 28. Rather, fluid flows from passage 30 into passage 32, and is dumped into port 8 because passage 32 communicates with that port 8. Consequently, restrictor or plunger 46 in FIG. 5 is pushed fully leftward. Chamber 28 now communicates with both ports 6 and 8. The amount of communication between outlet port 8 and chamber 28 can be controlled by modulating the current passing through the PCV valve 26, that is, through the electromagnet 40 illustrated in FIG. 3. In the second regime, both motors 10 and 16 run.

FIG. 6 shows yet a third regime. The PCV valve 26 is partially open, thereby increasing the pressure gradient through the amount of fluid which passage 30 can dump into passage 32, and thus outlet port 8. Consequently, pressure in passage 30 is higher than during the second regime shown in FIG. 5. Thus, restrictor or plunger 46 moves farther to the right in FIG. 6, compared with FIG. 5. The amount of communication between outlet port 6, which leads to the second motor 16, and chamber 28 can be controlled by modulating the current passing through the PCV valve 26, that is, through the electromagnet 40 in FIG. 3. In the third regime, flow to the second motor 10 is controlled by the current passing through the PCV valve 26.

Therefore, the amount of closure of valve PCV valve 26 in FIGS. 4–6 controls the left-right position of restrictor or plunger 46. The left-right position controls (1) whether outlet port 8 is blocked, (2) the amount of blockage (3) whether outlet port 6 is blocked, (4) the amount of blockage of ports 6 and 8 also controls the pressure in cavity 28, which is delivered to motor 10 and appropriately motor 16. For example, in general, blockage of port 8 raises that pressure, and additional blockage of port 6 further raises that pressure.

Operation of Motors 10 and 16

The operation of motors 10 and 16, under control of valve 4 will now be further summarized. When low cooling is demanded, both motors 10 and 16 in FIG. 1 run, but at a low speed. System pressure, represented by that on line 12 in FIG. 1, is low. Since the energy delivered by the pump 2 is proportional to the product of (system pressure)×(flow rate), the energy consumed by that pump 2 is relatively low.

As cooling demand increases, flow to motor 16 is gradually restricted, thereby (1) increasing system pressure and (2) diverting that flow to motor 10. The speed of motor 10 increases, providing greater cooling, and the energy delivered by the pump 2 increases because of the increased system pressure. This brief explanation will now be expanded.

The control system 64, shown in FIG. 1, receives the various sensor inputs (60 and 62), applies them to the control algorithm 72 (in FIG. 8 or the routine in FIG. 12 described later) and delivers the output or control current to the PCV valve 26.

Assume that the vehicle (not shown) containing the system of FIG. 1 is started from a cold condition. At this time, no cooling is demanded by the control system 64. The valve 4 assumes the position shown in FIG. 5. Both motors 10 and 16 run at a relatively low speed. The situation is indicated by region A in FIG. 7: both motors run, at low speed, and at low pressure.

As the coolant temperature increases, the control 64 (FIG. 1) begins to demand cooling. It applies a small current to PCV valve 26 in FIGS. 1 and 2, thereby creating a pressure drop in communication between passages 30 and 32 in FIGS. 2 and 3, thereby increasing the pressure in passage 30 in FIG. 2. This increase causes the restrictor or plunger 46 to move the right, blocking output port 8, thereby directing the flow formerly discharged through that port 8 to motors 10 and 16, causing their speeds to increase. The situation is indicated by region B in FIG. 7: both motors run, at higher pressure and higher speed.

As further cooling is demanded by control 64 in FIG. 1, a larger current is applied to PCV valve 26 in FIG. 3, further increasing pressure drop in communication between passages 30 and 32 in FIGS. 2 and 3, thereby further increasing the pressure in chamber 12 in FIG. 2. This increase causes the restrictor or plunger 46 to move further to the right (as viewed in FIG. 2), restricting output port 6 sufficiently that the flow through that port 6 is modulated by the current delivered to the PCV valve 26. The situation is indicated by region C in FIG. 7. Thus, motor 10 in FIGS. 1 and 2 is driven directly by pressure in line 12, and the speed of motor 16 is modulated by the flow through outlet port 6, which is modulated by position of restrictor or plunger 46.

In region C, the speed remains relatively constant. That constancy is caused by the fact that the total flow available, which is about 2.25 gallons per minute in a one embodiment, can produce only the speed indicated in region C as flow is split between the two motors 10 and 16.

As the restrictor or plunger 46 continues to move to the right (as viewed in FIG. 2), the control 64 in FIG. 1 continues to demand more cooling, outlet port 6 becomes sufficiently constricted that the pressure drop across it equals that across motor 10. At this time, virtually all torque is developed on motor 10 and motor speed increases as system pressure rises further. The situation is indicated by region D in FIG. 7. It should be appreciated that no fluid is delivered to motor 16, all fluid is delivered to motor 10, whose speed increases. Pressure in region D is highest of the four regions, A, B, C, and D.

A check ball 66 or a slip clutch 68 on the shaft between motors 10 and 16, allows the motor 16 to transform into a pump or slip respectively during this region.

Control System

Various stratagems can be implemented to determine how the operation of the motors 10 and 16 is allocated among regions A, B, C, and D in FIG. 7. The routine 72 illustrated in FIG. 8 is one such stratagem, and another simplified approach will now be described relative to FIG. 12.

In this simplified approach shown in FIG. 12, a specific temperature is measured, such as coolant temperature measured at a specific point in the cooling circuit. Deviation between the measured temperature and a target value is computed, and the difference represents a demand signal. A known control system is used to modulate the current delivered to electromagnet 40 in FIG. 3, to reduce the difference or demand signal.

In a more complex approach, multiple inputs may be measured as mentioned earlier, such as radiator temperature, measured by sensor 60 in FIG. 1, and the head pressure in the air conditioning system measured by sensor 62. In addition to controlling variables such as those previously described, the control 64 undertakes additional functions, which are indicated by the routine 101 represented by the flow chart of FIG. 12.

Block 100 indicates the overall control function, including modulation of PCV valve 26, in response to parameters indicative of cooling demand. However, unless restrictive measures are taken, this modulation can result in an unnecessarily high speed of fan 14 under certain conditions as mentioned earlier. Block 105 indicates a restrictive measure to prevent this high speed which, if not controlled, results in fan roar.

A simple implementation of this block 105 is to inquire whether high cooling is demanded. If not, measures are taken to restrict fan speed to a limit (such as those mentioned relative to blocks 200, 228, 238, etc. in FIG. 8), as by utilizing a governor (not shown) or by using logic in control 64 which modulates the PCV valve 26 to keep fan speed in the lower regions in FIG. 7, as in region A, B, C, or the lower regions of D.

In block 105 (FIG. 12), if high cooling is demanded, but flow of pump 2 in FIG. 1 is low, the PCV valve 26 is modulated to divert all flow to motor 10, thereby increasing speed of that motor 10. This can occur, for example, if the vehicle tows a trailer up a hill on a hot day and then stops. Speed of the pump 2 is thereby reduced, but residual heat from the load of towing may be present. The logic of block 105 would be implemented to dissipate that residual heat.

At block 110, all flow is diverted to motor 10 if high cooling demand exists with low pump flow.

In block 115, if a temporary acceleration occurs, engine speed will increase, ordinarily calling for increased cooling. However, the control 64 detects the fact that the acceleration is temporary, and modulates PCV valve 26 to reduce fan speed, while the temporary acceleration occurs.

In block 120, if the acceleration produces an engine speed which is sustained beyond a time threshold, such as a predetermined number of seconds, then fan speed is allowed to increase. In one approach, the limit imposed by block 115 is removed after the time threshold expires because the temporary acceleration to which block 115 responds has been found to disappear.

At block 120, fan speed is increased if sustained if higher engine speed occurs.

In block 125, an override is imposed. If a measured specific temperature, such as radiator top-tank temperature, exceeds a limit, speed of the fan 14 in FIG. 1 is increased by control 64, despite the fact that other parameters, taken together, do not call for the increase.

In block 130, system pressure is limited, when speed of fan 14 peaks. That is, as shown in FIG. 9, fan speed peaks at point B in region C in FIG. 9. Given that peaking, no reason exists to increase system pressure because that increase would increase the work done by pump 2, without an increase in fan speed.

FIGS. 10A–10E illustrate various operational characteristics of the embodiment described.

An alternate embodiment is shown in FIG. 13 based on a flow control circuit. In this case, pump 300 feeds flow from reservoir 302 to inlet port 304 of valve assembly 306. Fluid is introduced to inlet passage 308 upon which it forces plunger 310 to the left compressing spring 312. This will open port 314 feeding flow to motor 316 and also port 318 which allows flow to bypass both motors 316 and 320 returning to reservoir 302. Flow may also move through a flow control variable orifice 329 and an out port 326 to a motor 320.

It should be noted that motors 316 and 320 drive a fan 328 through a common shaft 330. A check-ball 332 or overriding clutch 322 allow motor 316 to freewheel when flow is not adequate to maintain speed with input to motor 320.

Feedback channel 65 transmits the pressure downstream of an orifice 329 and therefor annular port 326 to a spring chamber 328.

A solenoid actuator 342 moves pintle piece 343 back and forth changing the size of orifice 329

During a typical operation given that an actuator 342 has moved pintle 343 to a closed position (FIG. 13 shows pintle in midrange position), where orifice 329 is small in area, minimal flow through 329 is required to establish the pressure balance on either end of the plunger 310. At this point, the plunger 310 falls back to allow a portion of the flow to port 318, thereby bypassing the motors 320 and 316.

With actuation of the pintle 343 to the right (as viewed in FIG. 13), additional flow is needed across 329 to maintain the required plunger pressure differential, thus the plunger 310 moves to the right (as viewed in FIG. 13) slightly restricting bypass port 318. The pressure differential required on either end of the plunger 310 to maintain balance is thus defined by the spring compression force at the point of bypass port opening 318 divided by the plunger area. This is typically on the order of about 25 psi.

As the pintle moves more to the right, plunger 310 adjusts further restricting flow to port 318 and increasing flow through 329 thus maintaining the pressure drop on either end of the plunger 310. This electrically variable flow control mechanism and controls flow to motor 320.

With the second port 314 a pressure is applied to motor 322 which is approximately 25 psi higher than the pressure generated when the controlled output flow at 326 is applied to motor 320. At some point, with further widening of the orifice 329, the full available flow moving through orifice 329 will not generate enough pressure drop to maintain the plunger pressure balance. At this point, the plunger 310 will completely cover port 318 forcing all flow to the combination of the two motors 316 and 320. The assembly will thus resume a second flow control function using the port 314 to motor 316 as bypass to control the flow across orifice 329 and thus to motor 320. This movement of the plunger 310 to a metering position on port 314 will thus change the differential across orifice 329 required to maintain the plunger balance to some lower Dp. It would now approximate the spring load on plunger 310 divided by the plunger area when port 314 is just beginning to meter and, therefore, would be somewhat less than 25 psi.

With yet further movement on the pintle 343 to the right (as viewed in FIG. 13), all flow will be forwarded to the motor 320 for maximum possible fan speed given the available flow at inlet 304. In this manner, as in the pressure control based system described earlier, a single pilot actuated plunger 310 can both meter flow to a combination of loads and also meter a flow to one or the two loads to eventually force all available flow to the primary motor 320.

Additional Considerations

This invention may be used in combination with features of one or more of the following U.S. Pat. Nos., which are hereby incorporated by reference and made a part hereof: U.S. Pat. Nos. 4,189,919, 5,535,835, 5,561,978, 5,687,568, 5,881,630.

The mechanism could be incorporated with a hydraulic power steering system as defined by the general grouping of components 20 in which case pressure relief bypass around the steering rotary valve RV in FIG. 1 would be of considerable importance as it would not only set the steering maximum pressure, but would also provide a bypass for fluid flow to allow the fan to operate when the steering system was in pressure relief mode.

Further, such a steering integrated system could include a pressure relief mechanism 24, preferably, packaged within a plunger (not shown), which would allow the steering system to have priority over the fan system. These features are defined further in U.S. Pat. Nos. 5,535,845 and 5,881,630 assigned to the Assignee of the present invention, all of which are incorporated herein by reference and made a part hereof.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the inventions, which is defined in the appended claims.

What is claimed is:

1. A valve for use in a hydraulic system comprising a first hydraulic load and a second hydraulic load:
   a valve body having a plunger biased by a spring to a home position; said plunger being seated in said valve body and having a first area on a first side of said plunger and a second area on a second side of said plunger;
   said valve body assembly comprising a passageway in communication with said first and second area and said valve body controlling fluid flow to said first and second hydraulic loads;
   said valve body controlling flow to said first and second hydraulic loads to drive a common load in response to a plurality of pressures and a single control input.

2. The valve according to claim 1, wherein said valve further comprises:
   a restrictor for creating a first restriction in parallel with said first and second hydraulic loads in response to said single control input.

3. The valve according to claim 1, wherein the valve body is coupled in series to a power steering system.

4. The valve according to claim 2, wherein said restrictor is a pressure control valve.

5. The valve according to claim 2 wherein said valve comprises a pressure control valve which controls said restrictor in response to said single control input.

6. The valve according to claim 2 wherein said restrictor comprises a second plunger.

7. The valve according to claim 6 wherein said valve comprises a plurality of ports, said actuator being controlled by said restrictor to restrict flow through at least one of said plurality of ports in order to control said first and second hydraulic loads.

8. The valve according to claim 1, wherein said valve body comprises a second plunger for controlling pressure on both sides of said plunger in response to said single control signal.

9. The valve according to claim 1 wherein said valve comprises a bypass in parallel with said first and second hydraulic loads.

10. The valve according to claim 9 wherein said first and second loads comprise hydraulic motors.

11. The valve according to claim 9 wherein said valve comprises a restrictor for restricting flow to at least one of said first and second hydraulic loads.

12. The valve according to claim 11 wherein said restrictor sequentially controls flow to bypass and one of said first and second hydraulic loads.

13. The valve as recited in claim 1, wherein said common load is either a fan.

14. The valve as recited in claim 13 wherein said first and second hydraulic loads comprise at least one of a motor or hydraulic cylinder.

15. The valve as recited in claim 1 wherein said first and second hydraulic loads comprise at least one of a motor or hydraulic cylinder.

16. A valve assembly comprising:
   a single valve housing for housing a first valve;
   a second valve responsive to a control input to control said first valve, thereby controlling an amount of flow to a plurality of loads, each of said plurality of loads being coupled to a common load;
   said single valve housing comprising a restrictor in order to restrict flow to a load bypass and at least one of said plurality of loads, said restrictor being responsive to a plurality of pressures and said second valve being responsive to said control input to control flow to said plurality of loads.

17. The valve assembly as recited in claim 16 wherein said single valve housing comprises:
   a first port coupled to a first load;
   a second port coupled to a second load;
   a third port coupled to a bypass;
   said second valve controlling flow to said first, second and third ports in response to said single control input.

18. The valve assembly as recited in claim 17 wherein said single valve housing comprises:
   a pilot valve;
   said restrictor being operative to at least partially or fully restrict flow to each of said ports.

19. The valve assembly as recited in claim 18 wherein said restrictor is in parallel with said first and second loads and in series with one of said first or second loads.

20. The valve assembly as recited in claim 17 wherein said first valve is a pressure control valve which controls flow to said third port.

21. The valve assembly as recited in claim 17 wherein said bypass is in parallel with said first and second loads.

22. The valve assembly as recited in claim 16 wherein said loads are motors and said common load is a fan.

23. The valve assembly as recited in claim 16 wherein said common load comprises a common output shaft.

24. The valve assembly as recited in claim 23 wherein said output shaft drives a fan.

25. The valve assembly as recited in claim 16 wherein said second valve is a spool or plunger.

26. The valve assembly as recited in claim 16 wherein a second restriction is in parallel with at least one of said first or second loads.

27. The valve according to claim 16 wherein each of said plurality of loads comprise hydraulic motors.

28. A valve assembly comprising:
   a single valve housing for housing a first valve;
   a second valve responsive to a control input to control said first valve, thereby controlling an amount of flow to a plurality of loads;
   said single valve housing comprising a restrictor in order to restrict flow to at least one of said plurality of loads; and
   a second restriction in parallel with one of the loads; wherein said second restriction is a check valve.

29. The valve as recited in claim 28 wherein said check valve is in parallel with at least one of said plurality of loads and said plurality of loads are subject to at least one series restriction.

30. A valve assembly comprising:

A valve assembly comprising:
   a single valve housing for housing a first valve;
   a second valve responsive to a control input to control said first valve, thereby controlling an amount of flow to a plurality of loads;
   said single valve housing comprising a restrictor in order to restrict flow to at least one of said plurality of loads;
   a first port coupled to a first load;
   a second port coupled to a second load;
   a third port coupled to a bypass:
   said second valve controlling flow to said first, second and third ports in response to said input control signal;
   a pilot valve;
   said restrictor operative to at least partially or fully restrict flow to each of said ports; and
   wherein said restrictor opens and closes flow to one of said first, second and third ports sequentially.

\* \* \* \* \*